(12) United States Patent
Yamamoto et al.

(10) Patent No.: US 12,196,262 B2
(45) Date of Patent: Jan. 14, 2025

(54) SLIDING MEMBER

(71) Applicant: DAIDO METAL COMPANY LTD., Nagoya (JP)

(72) Inventors: Ayako Yamamoto, Inuyama (JP); Yoshifumi Ito, Inuyama (JP)

(73) Assignee: DAIDO METAL COMPANY LTD., Nagoya (JP)

( * ) Notice: Subject to any disclaimer, the term of this patent is extended or adjusted under 35 U.S.C. 154(b) by 0 days.

(21) Appl. No.: 17/839,622

(22) Filed: Jun. 14, 2022

(65) Prior Publication Data

US 2022/0412404 A1 Dec. 29, 2022

(30) Foreign Application Priority Data

Jun. 29, 2021 (JP) ................. 2021-107214

(51) Int. Cl.
*F16C 33/10* (2006.01)
*B22F 3/11* (2006.01)
*B22F 7/00* (2006.01)
*F16C 33/12* (2006.01)

(52) U.S. Cl.
CPC ............ *F16C 33/128* (2013.01); *B22F 3/114* (2013.01); *B22F 7/00* (2013.01); *B22F 7/004* (2013.01); *F16C 33/121* (2013.01); *F16C 2208/32* (2013.01); *F16C 2220/20* (2013.01); *F16C 2223/30* (2013.01); *F16C 2240/60* (2013.01)

(58) Field of Classification Search
CPC .... F16C 33/128; F16C 2208/32; F16C 33/20; F16C 33/145; B22F 3/114
See application file for complete search history.

(56) References Cited

U.S. PATENT DOCUMENTS 6,416,851 B1 7/2002 Kuroiwa et al.
8,613,555 B2 * 12/2013 Benco ................ F04C 23/008
384/294

(Continued)

FOREIGN PATENT DOCUMENTS

JP 2006-132540 A 5/2006
JP 2008-164007 A 7/2008
JP 2008-261374 A 10/2008

(Continued)

OTHER PUBLICATIONS

Office Action dated May 20, 2024 in corresponding Korean Patent Application No. 10-2022-0077993.

(Continued)

*Primary Examiner* — Adam Krupicka
(74) *Attorney, Agent, or Firm* — Harness, Dickey & Pierce, P.L.C.

(57) ABSTRACT

The present invention provides a sliding member which enables further reduction of friction and improvement of seizure resistance without deteriorating wear resistance of a sliding surface. The sliding member includes a porous metal base material, and a resin material with which the porous metal base material is impregnated. The sliding member includes an exposed sliding surface. The sliding surface includes a top surface made of the resin material, and a bottom surface made of the porous metal base material. A height from the bottom surface to the top surface is 10 to 30 μm, and the resin material includes fluorine resin.

15 Claims, 1 Drawing Sheet

(56) References Cited

U.S. PATENT DOCUMENTS

2012/0288392 A1 11/2012 Benco et al.
2019/0186539 A1* 6/2019 Kurosaki .............. F16C 33/124

FOREIGN PATENT DOCUMENTS

| JP | 2017-057862 A | 3/2017 |
| JP | 2019-105334 A | 6/2019 |
| KR | 2001-0023293 A | 3/2001 |

OTHER PUBLICATIONS

Office Action dated Sep. 10, 2024 in corresponding Japanese Application No. 2021-107214.

* cited by examiner

SLIDING MEMBER

BACKGROUND OF THE INVENTION

(1) Field of the Invention

The present invention relates to a sliding member.

(2) Description of Related Art

In conventional slide bearings, it is known to use a resin material for a sliding surface which supports a mating member via lubricating oil. In such slide bearings, some suggestions have been made for the prevention of seizure and wear and for friction reduction.

JP 2019-105334 A shows a slide bearing in which a plurality of recesses are provided on an inner circumferential surface of a cylindrical base material supporting a shaft member, and further the inner circumferential surface is covered with a resin layer. JP 2019-105334 A suggests that each recess has a first surface angled at an angle of about 90 degrees with respect to the inner circumferential surface, and a second surface intersecting the inner circumferential surface at an angle of less than 90 degrees, so that an air layer intervenes in a region where the lubricating oil contacts the inner circumferential surface so as to reduce friction of an oil film. In the case of this slide bearing, however, the machining process becomes apparently complicated in order to provide the plurality of recesses.

JP 2006-132540 A shows a bearing of a compressor for a refrigerator using a bronze-based alloy instead of aluminum which tends to corrode due to an alternate refrigerant. This bearing is formed so that a resin material is impregnated into pores in a porous bronze-based alloy provided on a back metal, and the bronze-based alloy and the resin material are exposed on a sliding surface, for improvement of resistance to seizure and reduction of a wear amount. JP 2006-132540 A shows that the resin material is a composite substance consisting of a synthetic resin including PTFE (polytetrafluoroethylene) and a lead-free lubricant (claim 3), and the ratio of the exposure area of the bronze-based alloy is 5% or more and 60% or less.

JP 2017-057862 A shows a sliding member containing thermoplastic resin as a main component, wherein micro depressions are formed on a surface instead of forming a low frictional coating such as fluorine resin on the surface, so that friction is comparatively inexpensively reduced and a sliding property is improved. An average maximum diameter of openings of the micro depressions is 50 µm to 150 µm, and distribution density of the micro depressions per unit area is 3/mm$^2$ or more and 30/mm$^2$ or less (paragraph 0006).

JP 2008-164007 A shows an oilless bearing bush used for a hinge mechanism of a door or the like of an automobile. This bearing bush includes a porous bronze sintering layer formed integrally with a surface of a back metal, and a slide layer of a synthetic resin composition which fills and coats pores and a surface of the porous bronze sintering layer by means of a pressure roller, and the porous bronze sintering layer is exposed on a surface of the slide layer in a scattered manner. During manufacture of the bearing bush, the slide layer expands due to stress relaxation after pressuring by the pressure roller, so that recesses having a depth of 1 to 2.5 µm are formed (FIG. 7). In view of the problem that electric conductivity of the bearing bush necessary for electrostatic coating deteriorates due to the recesses, JP 2008-164007 A suggests providing a metal plating layer in the recesses (FIG. 4).

BRIEF SUMMARY OF THE INVENTION

In recent years, viscosity of lubricating oil has been lowered from the viewpoint of resource saving, and therefore a sliding surface of a sliding member tends to be in a boundary lubrication state. Therefore, friction reduction of the sliding surface is required for the sliding member under the use of low-viscosity lubricating oil. Meanwhile, in order to improve seizure resistance and wear resistance, it is effective to enhance a heat radiation property by exposing a porous metal base material on the sliding surface of the sliding member, and therefore it is necessary to reduce the friction under the use of low-viscosity lubricating oil as described above while exposing the porous metal base material.

The slide bearing shown in JP 2019-105334 A entails complicated manufacture, and, moreover, deteriorates in heat radiation property and tends to cause seizure when the whole inner circumferential surface is covered with a resin layer. Further, since the sliding member shown in JP 2017-057862 A contains the thermoplastic resin as ae main component, it is not easy to improve both heat radiation property and wear resistance. In addition, in the sliding members shown in JP 2006-132540 A and JP 2008-164007 A, since a resin material and a metal material are uniformly arranged on a sliding surface, the wear resistance may be improved, but further reduction of friction is difficult.

Therefore, an object of the present invention is to provide a sliding member which supports a mating member via lubricating oil, and includes a porous metal base material, and a resin material with which the porous metal base material is impregnated, in which friction is further reduced, without deteriorating wear resistance of a sliding surface, to improve seizure resistance. Another object of the present invention is to provide a sliding member which is easy to manufacture and economical.

In order to achieve the abovementioned object, according to the present invention, there is provided a sliding member including a porous metal base material, and a resin material with which the porous metal base material is impregnated, wherein the sliding member has an exposed sliding surface, the sliding surface is formed so as to include a top surface made of the resin material, and a bottom surface made of the porous metal base material, a height from the bottom surface to the top surface is 10 to 30 µm, and the resin material includes fluorine resin.

The ratio of the total area of the bottom surface in the sliding surface is preferably 5 to 60%.

The sliding member may further include a back metal, and the porous metal base material and the resin material are arranged on one surface of the back metal.

Furthermore, the porous metal base material is preferably a spherical or irregular-shaped metal or alloy.

According to the present invention, since the sliding surface of the sliding member has the top surface and the bottom surface (i.e. a concavo-convex shape), a supported member such as a shaft member slides on the top surface made of the resin material to prevent contact with the porous metal base material constituting the bottom surface. This can reduce friction, and thus suppress a heat generation amount. Further, since recesses having a depth of 10 to 30 µm are formed by the top surface and the bottom surface, oil retaining property can be improved.

Further, according to the present invention, since the bottom surface made of the porous metal base material is exposed on the sliding surface, heat radiation property are enhanced. This prevents the resin material from softening, and thus contributes to improvement of the wear resistance.

According to the present invention, in order to exert the above effects, a distance i.e. height from the bottom surface to the top surface measured perpendicularly to the sliding surface is 10 to 30 μm. If the height is 10 μm or less, since the top surface is worn away by about 5 μm during running-in, a transfer effect of the resin material to the supported member at an early stage of running becomes insufficient, and supply of the resin material onto the porous metal base material during running becomes short. This can increase the friction, and therefore causes the seizure. On the contrary, if the height from the bottom surface to the top surface is 30 μm or more, the heat radiation effect of the sliding member resulting from the exposure of the porous metal base material cannot be sufficiently obtained in an initial state, so that the resin material softens and is worn away. Accordingly, an oil film becomes broken more easily, which increases the friction, and therefore causes the seizure more easily also.

Further, according to the present invention, the ratio of the total area of the bottom surface to the sliding surface (i.e. exposure rate) is 5 to 60%. When this ratio is 5% or less, the above-described effect of wear resistance by the exposure of the porous metal base material is not obtained, whereas when this ratio is 60% or more, seizure resistance deteriorates, and the sliding member becomes unable to serve the purpose.

The present invention and its advantageous effects will be described below in detail with reference to the accompanying drawings. It will be appreciated that the drawings illustrate a nonexclusive embodiment only for the purpose of exemplification.

DESCRIPTION OF THE EMBODIMENTS

Regarding a sliding member 1 according to one embodiment of the present invention, its structure and manufacturing method will be described below in detail.

Structure of Sliding Member

Figure 1:
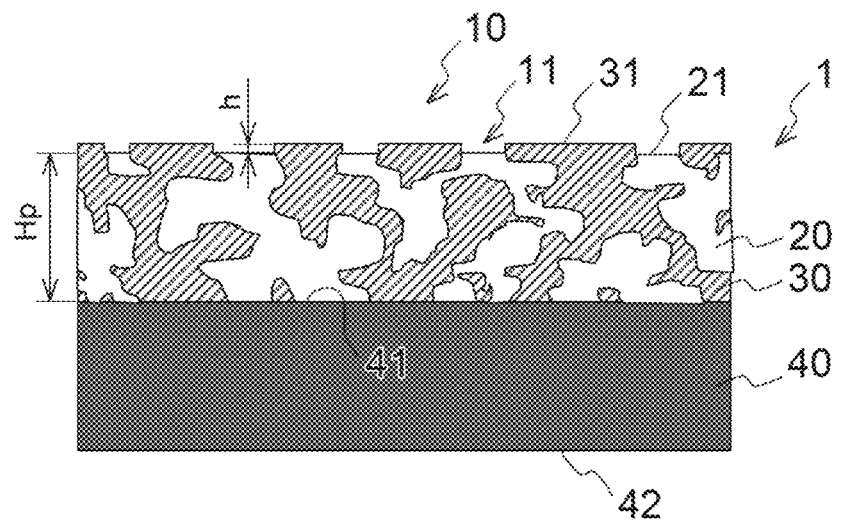
FIG. 1 is a schematic sectional view, perpendicular to a sliding surface, of a sliding member according to the present invention.

FIG. 1 is a schematic sectional view of the sliding member 1. The sliding member 1 includes a back metal 40, a porous metal base material 20 formed on one surface 41 of the back metal 40, and a resin material 30 impregnated into a void of the porous metal base material 20, and is formed in a plate shape.

Figure 3:
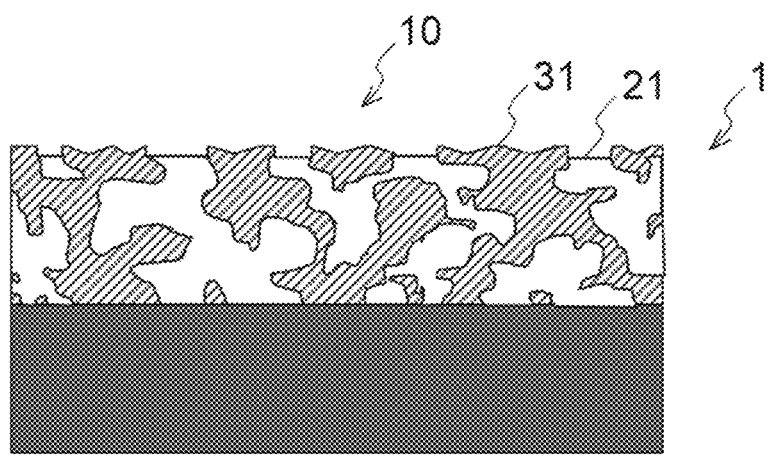
FIG. 3 is a schematic sectional view, perpendicular to a sliding surface, of another sliding member according to the present invention.

The sliding member 1 also includes a sliding surface 10 formed on a side opposite to another surface (i.e. a back surface) 42 of the back metal 40, and the porous metal base material 20 and the resin material 30 are exposed in a mixed state on the sliding surface 10. Specifically, the sliding surface 10 includes a flat top surface 31 made of the resin material 30, and a flat bottom surface 21 made of the porous metal base material 20. The bottom surface 21 has a distance i.e. a height Hp perpendicularly measured from the one surface 41 of the back metal 40, and the top surface 31 is formed so as to be higher than this height Hp. Note that, as illustrated in FIG. 3, the top surface 31 may not be limited to a flat shape.

In the present embodiment, the height Hp of the porous metal base material 20 may be 0.3 mm, for example. Further, according to the present invention, a distance or a height h measured perpendicularly to the sliding surface 10 (or to the one surface 41 of the back metal 40) from the bottom surface 21 to the top surface 31 is 10 to 30 μm. Note that when the top surface 31 is not flat as illustrated in FIG. 3, the height h is defined as a distance measured perpendicularly to the sliding surface 10 (or to the one surface 41 of the back metal 40) from the bottom surface 21 to the highest point of the top surface 31.

As illustrated in FIG. 1, the sliding surface 10 includes a recess 11 formed due to a step between the top surface 31 and the bottom surface 21, and it will be appreciated that the depth of this recess is 10 to 30 μm.

Note that according to the present invention, the ratio of the total area of the bottom surface 21 to the sliding surface 10 (i.e. the exposure rate of the porous metal base material 20) is preferably 5 to 60%, in consideration of the lower limit value relating to wear resistance and the upper limit value relating to seizure resistance.

Material of Sliding Member

Copper, a copper alloy, a bronze-based alloy, aluminum, an aluminum alloy, iron, steel, or the like can be used for the porous metal base material 20. Further, spherical powder or irregular-shaped powder can be used for the porous metal base material 20, while it is preferable to use the irregular-shaped powder in particular.

The resin material with which the porous metal base material is impregnated includes PTFE as fluorine resin, molten fluorine resin as another resin, and graphite or molybdenum disulfide as a solid lubricant. In addition, the resin material may include an inorganic material such as barium sulfate, or hard particles such as alumina.

Manufacturing Method of Sliding Member

The sliding surface 10 is manufactured by the following steps.

(1) After fluorine resin and various fillers are mixed together, a molding aid is added to an obtained mixture, and the molding aid and the mixture are stirred and mixed together to obtain a resin raw material.

(2) The resin raw material obtained in the above step (1) is scattered and supplied onto a porous metal base material provided on a back metal made of a steel plate. The resin raw material is rolled by a roller, and impregnated into a void of the porous metal base material provided by sintering while a coating layer made of the resin raw material is uniformly formed on a surface of the porous metal base material.

(3) The member obtained in the above step (2) is held in a drying furnace heated to 100 to 200° C. to remove the molding aid.

Figure 2:
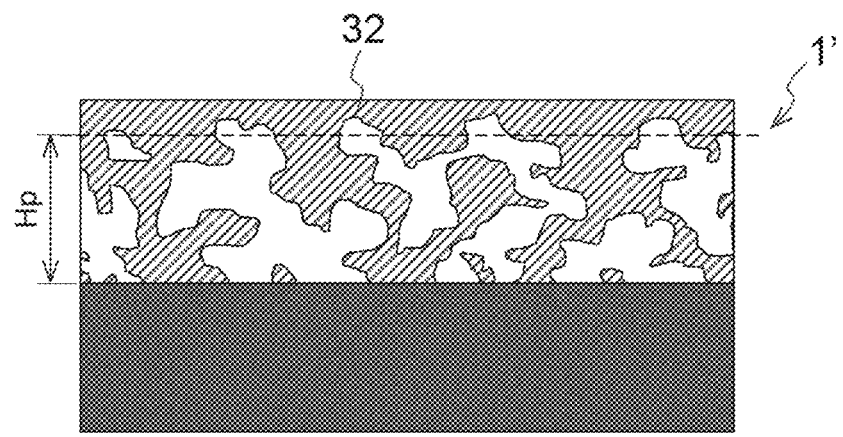
FIG. 2 is a schematic sectional view of the sliding member in FIG. 1 before the sliding surface is subjected to cutting.

(4) The member from which the molding aid has been removed is introduced into a heating furnace, sintered by being heated within a temperature range of 380 to 420° C., then cooled, and rolled into a predetermined dimension by a roller to form a member 1' having a predetermined thickness (FIG. 2).

(5) A coating layer 32 side of the member 1' obtained through the above steps (1) to (4) is cut so that the resin material and the porous metal base material have a desired height (thickness) Hp (see the broken line in FIG. 2), and a sliding member having a desired thickness is formed. Note that this cutting step may be carried out for a flat plate of the member 1' cut into a predetermined dimension, or carried out after the member 1' is formed into a cylindrical rolled bushing. In the case of providing a cylindrical sliding member, the cutting step is preferably carried out after the member 1' is formed into a rolled bushing because dimensional accuracy is improved.

Although the sliding surface is once formed uniformly (i.e. flat) by the above step (5), the top surface 31 made of the resin material 30 becomes higher than the bottom surface 21 made of the porous metal base material 20 (i.e. the distance measured perpendicularly from the back metal becomes large) after the elapse of a certain time. The principle thereof is that the resin impregnated and pressed into the void of the porous metal base material in the above step (4) is at least partly unbound (relaxation of internal pressure) from the porous metal base material due to the cutting in the above step (5), and expands.

The present inventors found that the above internal pressure was determined depending on the balance of the amount of a molding aid to be mixed in a resin material, the porosity of a porous metal, the height Hp of the porous metal, and the rolling amount in the above step (4). In one embodiment of the present invention, the internal pressure of the resin material within the void of the porous metal base material was increased by setting the rolling amount in the above step (4) within a specific range, and the internal pressure was relaxed by the cutting in the above step (5), whereby a predetermined amount of a height difference was formed between the bottom surface made of the porous metal base material and the top surface made of the resin material.

Specifically, a reference rolling amount $L_R$ (mm) can be obtained by the following equation:

$$L_R = X/100 \times Hp \times V/100$$

where $L_R$: Reference rolling amount (mm)
X: Parts by weight (%) of a molding aid to a resin material in which fluorine resin and a filler are mixed together
V: Porosity (%) of a porous metal base material
Hp: Height (mm) of the porous metal base material.

In order to obtain the present embodiment, a rolling amount L (mm) needs to be within a range of 100 to 200% with respect to the reference rolling amount $L_R$ (mm), i.e. needs to satisfy the equation:

$$100 \leq L/L_R \times 100 \leq 200.$$

When $L/L_R \times 100$ is less than 100%, the internal pressure of the resin material is insufficient, so that the height from the bottom surface made of the porous metal base material to the top surface made of the resin material became less than 10 μm, whereas when $L/L_R \times 100$ is more than 200%, the internal pressure of the resin material became excessively high, so that the height from the bottom surface to the top surface is more than 30 μm. In addition, if a rolling amount is excessively large, there is the problem that the porous metal base material is crushed, and the ratio (exposure rate) of the area of the bottom surface (i.e. the porous metal base material) to the sliding surface after cutting varies.

In order to form a height difference between the bottom surface 21 and the top surface 31, the resin material preferably includes 65% or more of fluorine resin. This is because when the content is less than 65%, it becomes difficult for the resin material to expand by the relaxation of internal pressure. Moreover, the resin material more preferably includes PTFE and a solid lubricant. This is because a simple composition is more suited to utilize the expansibility of the resin material, whereas the solid lubricant is suited to the reduction of friction. Further, the porous metal base material is preferably irregular-shaped powder. This is because the irregular-shaped powder makes it difficult for the resin material expanded by the relaxation of internal pressure to return to an original position.

EXAMPLES

Performance Evaluation Test

In order to evaluate the wear amount, frictional coefficient, and seizure time of the sliding member according to the present invention, performance evaluation tests were conducted for Examples 1 to 7 and Comparative Examples 1 and 2.

Test Conditions

Test equipment: Thrust sliding test equipment
Load: (a: initial stage) 3 MPa→(b: later) 6 MPa
Speed: 1.5 m/s
Time: (a) 10 minutes →(b) up to seizure
Lubrication state: (a) oil bath→(b) oil removing
Mating shaft: S55C quenching Test Piece A sliding member obtained by the manufacturing method including the above steps (1) to (5) was cut to prepare a specimen having one side of 30 mm This specimen was further cut into a given thickness with a grinding wheel while using water-soluble cutting liquid to obtain a test piece.

Test Results

Test results of Examples 1 to 7 are shown in Table 1 below, and test results of Comparative Examples 1 and 2 are shown in Table 2 below. "PTFE" in the tables is CD097 manufactured by AGC, "other resins" are resins such as molten fluorine resin which are not PTFE, and "porous metal base material" is a bronze-based alloy (irregular shape) of Cu-10% Sn or a Cu-3% Sn-8% Bi alloy (spherical). Further, "amount X of molding aid" means the parts by weight (%) of a molding aid with respect to a resin material in which PTFE and a filler are mixed together, and "top surface height" means a height (μm) from the bottom surface to the top surface.

15 to 30 parts by weight of the molding aid X are mixed to the resin material, a porous metal base material having a porosity ranging from 40% to 70% is used, a porous metal base material having a height of 0.2 to 0.4 mm is used, and a resin material in which the rolling amount L is adjusted to 0.02 to 0.08 mm is used.

Furthermore, each item in the tables was determined by the following method.

Top surface height: the test piece was observed with a laser microscope to measure a height difference Exposure rate of porous alloy base material: the luminance of the porous metal was detected with an optical microscope, binarization was performed, and the ratio of the porous metal was determined as an exposure rate Wear amount: a thickness difference of the test piece before and after the test was measured Frictional coefficient: a frictional coefficient immediately after oil removing was measured Seizure time: a time from the removal of oil to test stopping (stopped at 190° C.) was measured As shown in Table 1, a top surface height of the present invention of 15 to 30 μm was able to be obtained by setting the ratio of the rolling amount to the reference rolling amount to 107 to 163%, and in each of these cases, the wear amount was 10 μm or less, the frictional coefficient was 0.04 or less, and the seizure time was 12 minutes or more. On the contrary, when the top surface height is 33 μm as shown in Comparative Example 1 of Table 2, the wear amount becomes an excessively large amount of 18 μm, and the frictional coefficient increases to 0.08. Further, when the top surface height is a small height of 7 μm as shown in Comparative Example 2, the wear amount is a small amount of 5 μm, but the frictional coefficient increases to 0.12, and the seizure time also worsens to 2 minutes.

While the embodiment and examples of the present invention have been described in detail with reference to the drawings and in relation to the performance evaluation tests, specific configurations are not limited thereto, and a modification which does not go so far as to depart from the spirit of the present invention set forth in claims falls within the present invention.

TABLE 1

|  |  | Example 1 | Example 2 | Example 3 | Example 4 | Example 5 | Example 6 | Example 7 |
|---|---|---|---|---|---|---|---|---|
| Composition of resin material (vol%) | PTFE | 92 | 78 | 85 | 65 | 92 | 85 | 78 |
|  | Other resins | — | 10 | — | 15 | — | — | 10 |
|  | Solid lubricant Graphite | 8 | 10 | 10 | — | — | 15 | 10 |
|  | Solid lubricant $MoS_2$ | — | — | 5 | 10 | 8 | — | — |
|  | Inorganic material | — | — | — | 10 | — | — | — |
|  | Hard particles | — | 2 | — | — | — | — | 2 |
| Porous metal base material | Kind | Bronze-based alloy | Bronze-based alloy | Bronze-based alloy | Bronze-based alloy | Cu-Sn-Bi alloy | Bronze-based alloy | Bronze-based alloy |
| $L/L_R \times 100$ (%) |  | 129 | 107 | 119 | 112 | 163 | 119 | 107 |
| Top surface height (μm) |  | 28 | 23 | 20 | 15 | 30 | 20 | 18 |
| Exposure rate of porous metal (%) |  | 20 | 15 | 27 | 46 | 37 | 58 | 8 |
| Wear amount (μm) |  | 6 | 5 | 5 | 4 | 3 | 2 | 10 |
| Frictional coefficient |  | 0.01 | 0.03 | 0.01 | 0.02 | 0.02 | 0.04 | 0.01 |
| Seizure time (minute) |  | 45 | 30 | 40 | 12 | 45 | 16 | 72 |

TABLE 2

|  |  | Comparative Example 1 | Comparative Example 2 |
|---|---|---|---|
| Composition of resin material (vol %) | PTFE | 92 | 65 |
|  | Other resins | — | 15 |
|  | Solid lubricant Graphite | 8 | — |
|  | Solid lubricant $MoS_2$ | — | 10 |
|  | Inorganic material | — | 10 |
|  | Hard particles | — | — |
| Porous metal base material | Kind | Bronze-based alloy | Bronze-based alloy |
| $L/L_R \times 100$ (%) |  | 202 | 94 |
| Top surface height (μm) |  | 33 | 7 |
| Exposure rate of porous metal |  | 25 | 32 |
| Wear amount (μm) |  | 18 | 5 |
| Frictional coefficient |  | 0.08 | 0.12 |
| Seizure time (minute) |  | 10 | 2 |

The invention claimed is:

1. A sliding member comprising a porous metal base material, and a resin material with which the porous metal base material is impregnated, wherein
the sliding member comprises an exposed sliding surface, the exposed sliding surface comprises a bottom surface made of the porous metal base material, and a top surface made of the resin material that is higher than the bottom surface, a height from the bottom surface to the top surface is 10 to 30 μm, the top surface does not extend below the bottom surface, and the resin material includes fluorine resin.

2. The sliding member according to claim 1, wherein a ratio of a total area of the bottom surface to the exposed sliding surface is 5 to 60%.

3. The sliding member according to claim 1, further comprising a back metal, wherein the porous metal base material and the resin material are arranged on one surface of the back metal.

4. The sliding member according to claim 2, further comprising a back metal, wherein the porous metal base material and the resin material are arranged on one surface of the back metal.

5. The sliding member according to claim 1, wherein the porous metal base material is formed of a spherical or irregular-shaped metal or alloy.

6. A sliding member comprising a porous metal base material, and a resin material with which the porous metal base material is impregnated, wherein
the sliding member comprises an exposed sliding surface, the exposed sliding surface comprises a bottom surface made of the porous metal base material, and a flat top surface made of the resin material that is higher than the bottom surface, a height from the bottom surface to the top surface is 10 to 30 μm, and the resin material includes fluorine resin.

7. The sliding member according to claim 6, wherein a ratio of a total area of the bottom surface to the exposed sliding surface is 5 to 60%.

8. The sliding member according to claim 6, further comprising a back metal, wherein the porous metal base material and the resin material are arranged on one surface of the back metal.

9. The sliding member according to claim 7, further comprising a back metal, wherein the porous metal base material and the resin material are arranged on one surface of the back metal.

10. The sliding member according to claim 6, wherein the porous metal base material is formed of a spherical or irregular-shaped metal or alloy.

11. A sliding member comprising a porous metal base material, and a resin material with which the porous metal base material is impregnated, wherein the sliding member comprises an exposed sliding surface, the exposed sliding surface comprises a bottom surface made of the porous metal base material, and a top surface made of the resin material that is higher than the bottom surface, a height from the bottom surface to the top surface is 10 to 30 µm, the entire top surface extending above the bottom surface, and the resin material includes fluorine resin.

12. The sliding member according to claim 11, wherein a ratio of a total area of the bottom surface to the exposed sliding surface is 5 to 60%.

13. The sliding member according to claim 11, further comprising a back metal, wherein the porous metal base material and the resin material are arranged on one surface of the back metal.

14. The sliding member according to claim 12, further comprising a back metal, wherein the porous metal base material and the resin material are arranged on one surface of the back metal.

15. The sliding member according to claim 11, wherein the porous metal base material is formed of a spherical or irregular-shaped metal or alloy.

* * * * *